United States Patent [19]

Koike et al.

[11] 4,137,046

[45] Jan. 30, 1979

[54] TRANSPARENT CELLULOSIC PAPER AND METHOD FOR MAKING THE SAME

[75] Inventors: Takashi Koike; Masahiro Amano, both of Tokyo, Japan

[73] Assignee: Mitsubishi Paper Mills, Ltd., Tokyo, Japan

[21] Appl. No.: 728,920

[22] Filed: Oct. 4, 1976

[30] Foreign Application Priority Data

| | | | |
|---|---|---|---|
| Oct. 7, 1975 | [JP] | Japan | 50-121131 |
| Nov. 29, 1975 | [JP] | Japan | 50-143084 |
| Apr. 19, 1976 | [JP] | Japan | 51-44246 |

[51] Int. Cl.[2] .......................... B32B 29/06; B05D 5/00

[52] U.S. Cl. ........................................ 8/192; 8/119; 8/DIG. 11; 427/161; 427/391; 427/395; 428/423; 428/425; 428/537; 428/918

[58] Field of Search ........................ 427/161, 391, 395; 8/DIG. 11, 192, 118, 119; 162/136, 164 R; 428/537, 423, 425, 918; 260/775 MA

[56] References Cited

U.S. PATENT DOCUMENTS

| | | | |
|---|---|---|---|
| 2,018,638 | 10/1935 | Driesen | 427/161 X |
| 3,112,984 | 12/1963 | Aldridge | 8/192 X |
| 3,425,973 | 2/1969 | Shaw, Jr. | 260/77.5 MA |

FOREIGN PATENT DOCUMENTS

| | | | |
|---|---|---|---|
| 1036572 | 1966 | United Kingdom | 427/161 |

OTHER PUBLICATIONS

Simonds et al., *Handbook of Plastics,* New York, D. Van Nostrand Co., Inc., 1943, p. 48.

David & Staley, *Analytical Chemistry of the Polyurethanes,* New York, Wiley–Interscience, 1969, pp. 398–399.

*Primary Examiner*—Ronald H. Smith
*Assistant Examiner*—Evan K. Lawrence
*Attorney, Agent, or Firm*—Cushman, Darby & Cushman

[57] ABSTRACT

A transparent cellulosic paper is produced by coating or impregnating a cellulosic paper with an organic solvent solution containing a compound having a weight-average molecular weight of 200 to 2,000 and having at least two isocyanate groups in a molecule or with an organic solvent solution containing, in addition to said compound, at least one compound selected from the group consisting of an aliphatic monohydric alcohol having 6 to 18 carbon atoms and a nonionic surface active agent to the polyethylene glycol type having one hydroxyl group in a molecule, the ratio OH/NCO in the solution being less than 1; removing said organic solvent; and allowing the coated or impregnated paper to harden by aging.

7 Claims, No Drawings

TRANSPARENT CELLULOSIC PAPER AND METHOD FOR MAKING THE SAME

BACKGROUND OF THE INVENTION

This invention relates to a method for producing a novel transparent paper particularly suitable as tracing paper or copying paper mainly used in drafting and reproduction and, further, as duplicating original to be made in combination with known reproduction processes such as diazotype, silver halide photography, and electrophotography.

Transparent papers conventionally used for the above purposes include:

(a) tracing papers made from highly wet-beaten natural cellulosic pulp, or said tracing papers further treated with, for example, a polymeric substance;

(b) transparent papers made from relatively opaque papers other than tracing papers by impregnating with a fat or an oil, plasticizer, liquid paraffin, or the like, or by further surface treatment of said impregnated papers;

(c) those made from a plastic film used as base material by surface modification; and (d) those manufactured by hot pressing a web formed from a mixture of thermoplastic synthetic resin pulp and natural cellulosic pulp, thereby to transparencize the web.

Transparent papers of the type (a), although used most widely, are inferior in dimensional stability and liable to curl, owing to their high sensitivity to humidity. Further, they have other defects in water resistance, tearing strength, etc. Members of the group (b) are superior to those of the group (a) in water resistance, tearing strength, and dimensional stability. However, when the paper is stored for a long period of time or is exposed to heat in the reproduction unit, the transparencizing agent tends to migrate, resulting in feathering of the image. Most of the papers of this type have further defects in writing quality and recovery from crease. The transparent papers of the group (c), although excellent in transparency, dimensional stability, and mechanical strengths, are very expensive and raises problems in waste disposal. Although improved in dimensional stability, the papers of the group (d) have disadvantages in that owing to uneven distribution of the synthetic pulp and the natural pulp, there are obtained papers having not uniform transparency but opaque speckles scattered about throughout the paper. Moreover, a special hot press installation is necessary in their manufacture.

As known well, transparency may be imparted generally by filling the pores of cellulosic paper with a substance having a refractive index approximating that of cellulosic fiber. However, if a liquid or low-melting solid substance is used as the transparencizing agent, a defective paper similar to those of the above-noted group (b) is obtained, while if a high-melting polymeric substance is used, increased viscosity of the transparencizing solution makes it difficult for the solution to penetrate into the cellulosic paper, thus leading to non-uniform transparency of the converted paper.

Accordingly, it is considered best at present to use as the transparencizing agent a reactive resin or a monomer which has a relatively low molecular weight so that it may penetrate sufficiently into the cellulosic paper and thereafter may be converted into a polymer by use of a catalyst, heat, and other means.

There is a precedent for the use of such a transparencizing agent. However, the polymers used were such thermosetting resins as phenol-formaldehyde resins, urea-formaldehyde resins, melamine-formaldehyde resins, and alkyd resins which had low rate of hardening. Although the rate of hardening can be increased to some extent by elevating the temperature or adding a catalyst, severe hardening conditions are undesirable because of their adverse effect of accelerating deterioration of the paper itself.

SUMMARY OF THE INVENTION

The object of this invention is to obtain an ideal transparent paper from a cellulosic base paper by a simple and inexpensive treatment.

The present invention provides a transparent cellulosic paper and a process for making the paper having the following two embodiments.

One embodiment of the process of this invention is characterized by coating or impregnating a cellulosic paper with an organic solvent solution consisting essentially of the organic solvent and a compound having a weight-average molecular weight of 200 to 2,000 and having at least two isocyanate groups in a molecule in an organic solvent, removing said organic solvent, and allowing the resulting coated or impregnated paper to harden by aging.

Another embodiment of the process is characterized by coating or impregnating a cellulosic paper with an organic solvent solution consisting essentially of the organic solvent and (a) a compound having a weight-average molecular weight of 200 to 2,000 and having at least two isocyanate (NCO) groups in the molecule and (b) at least one compound selected from the group consisting of an aliphatic monohydric alcohol having 6 to 18 carbon atoms and a nonionic surface active agent of the polyethylene glycol type having one hydroxyl (OH) group in the molecule, said compounds (a) and (b) being contained in a ratio of $OH/NCO < 1$; removing the organic solvent; and allowing the resulting coated or impregnated paper to harden by aging.

DESCRIPTION OF THE PREFERRED EMBODIMENTS

In the first embodiment, the compound having a weight-average molecular weight of 200 to 2,000 and having at least two isocyanate groups (hereinafter such a compound is referred to as polyisocyanate compound) in a molecule reacts not only with the moisture in air or in the paper to harden, but also with hydroxyl groups of the cellulose to form strong bonds. The polyisocyanate compound also reacts with one another. Thus, the polyisocyanate compound hardens within the paper, forming an integral mass.

In the second embodiment, the compound having a weight-average molecular weight of 200 to 2,000 and having at least two NCO groups in a molecule reacts with the second component comprising an aliphatic monohydric alcohol having 6 to 18 carbon atoms and/or a nonionic surface active agent of the polyethylene glycol type having one hydroxyl group in a molecule (hereinafter referred to as nonionic surface active agent of the polyethylene glycol type) to prevent the second component from migration; the remaining NCO groups reacts not only with the moisture in air or in the paper to harden, but also with hydroxyl groups of the cellulose to form strong bonds. The polyisocyanate compound also reacts with one another. Thus, the polyisocyanate compound, second component, and cellulose fiber form an integral mass.

The above-said reactions take place very easily without necessitating the particular exposure to a high temperature. These reactions proceed sufficiently when the paper coated or impregnated with the aforesaid organic solvent solution, after having been freed from the organic solvent, is left standing at room temperature for 1 to 5 days.

The transparent paper thus obtained has uniform transparency, because impregnation unevenness due to uneven formation of the web is very little; owing to the aforesaid integrated structure of the transparencizing agent and the cellulose fiber, this paper is characterized by improved heat resistance, distinguished water resistance, excellent dimensional stability, and low tendency to curl. With the second embodiment, it has become possible to control the internal plasticization by regulating the crosslinking density of the first component to a low level by the addition of the second component. Since the second component combines chemically with the first component, migration is completely excluded. The transparent paper has both desirable stiffness and proper flexibility.

Because of its dry touch and freedom from migration of the transparencizing agent, the present transparent paper is excellent in pencil writing quality and erasing quality. It is also suitable for use as copying paper in dry electrophotography (e.g. "Xerox" process), because it is excellent in fixing of the toner; owing to its improved heat resistance, proper stiffness, and excellent dimensional stability, none of such troubles as blister formation, difficulty in feeding the paper, and curling of the paper are encountered.

The compounds having a weight-average molecular weight of 200 to 2,000 and containing at least two isocyanate groups in a molecule, that is, polyisocyanate compounds, as herein referred to, include those compounds having isocyanate groups at the terminals of a molecule or in the side chain which are obtained by reacting, for example, a diisocyanate monomer with a compound having active hydrogen atoms at room temperature or with heating or, if necessary, in the presence of a catalyst; polymers of tolylene diisocyanate trimer; copolymers of tolylene diisocyanate trimer and hexamethylene diisocyanate; hexamethylene diisocyanate trimer and polymers thereof.

Examples of the diisocyanate monomers are tolylene diisocyanate, 4,4'-diphenylmethane diisocyanate, hexamethylene diisocyanate, and m-xylene diisocyanate. Examples of the compounds having active hydrogen atoms are diols such as ethylene glycol, polyethylene glycol, propylene glycol, polypropylene glycol, butenediol, and polybutadienediol; triols such as glycerol and trimethylolpropane; polyalcohols such as polyester-polyols and polyether-polyols; polyalkylamines, polyoxyalkylamines, and alkylalcoholamines having hydroxyl and amino groups.

A polyisocyanate compound having a weight-average molecular weight exceeding 2,000 has too high a viscosity even when diluted with a solvent and tends to give neither prescribed amount of impregnation nor uniform impregnation, resulting in not uniform transparency. On the other hand, a polyisocyanate compound having a weight-average molecular weight below 200 has too low a viscosity and, although suitable for impregnation, gives on age-hardening a hard and brittle resin, because of an excessively high isocyanate content of the compound.

Examples of the aliphatic monohydric alcohols having 6 to 18 carbon atoms, which are used in the second embodiment, include hexyl alcohol, heptyl alcohol, octyl alcohol, nonyl alcohol, decyl alcohol, lauryl alcohol, tridecyl alcohol, myristyl alcohol, cetyl alcohol, stearyl alcohol, isomers and mixtures thereof.

The nonionic surface active agents of polyethylene glycol type are nonionic surface active agents which are prepared using higher alcohols, alkylphenols or fatty acids as the hydrophobic group component and adding ethylene oxide as the hydrophilic group component and examples of such surface active agents are higher alcohol-ethylene oxide adducts, alkylphenol-ethylene oxide adducts, fatty acid-ethylene oxide adducts, etc. Preparation and kinds of such nonionic surface active agents of polyethylene glycol type are disclosed, for example, in Takehiko Fujimoto's "New Introduction Into Surface Active Agents" (pages 89 – 108).

In the second embodiment of the present invention, any of these aliphatic monohydric alcohols and nonionic surface active agents of polyethylene glycol type may be used, but they are preferably good in compatibility with the polyisocyanate compounds and the solvents therefor to cause no increase in viscosity and low in coloration. Furthermore, they are preferably liquid at normal temperature from the point of handling thereof. Of course, these may be used in admixture of two or more.

The most important point in the second embodiment is the molar ratio of a polyisocyanate compound as the first component to an aliphatic monohydric alcohol having 6 to 18 carbon atoms and/or a surface active agent of the polyethylene glycol type as the second component. This molar ratio should be such that the number of NCO groups in the first component and the number of OH groups in the second component satisfy the relation $OH/NCO < 1$, preferably $OH/NCO < 0.7$. If $OH/NCO \geqq 1$, polymerization of the first component, i.e. polyisocyanate compound, through crosslinking will not take place and the transparent paper obtained under such a condition will be inferior in water resistance and mechanical strengths.

The advantages of incorporating the second component, in addition to those mentioned above, are marked reduction in viscosity of the transparencizing solution and improvement in impregnation of the base paper with this solution. As the result, a transparent paper with high and uniform transparency may be obtained from a fine-grade base paper. Further, reduction in the cost of a transparencizing solution is achieved by incorporating a cheap second component in an expensive polyisocyanate compound. The low viscosity permits of increased construction of the transparencizing solution, resulting in savings in the cost of organic solvent and in the cost of removal and recovery of the organic solvent after impregnation or coating.

The solvents to be used in the present transparencizing solution are esters such as ethyl acetate and butyl acetate; ether-esters such as methyl "Cellosolve" acetate and "Cellosolve" acetate; and ketones such as methyl ethyl ketone, methyl isobutyl ketone, and cyclohexanone. Toluene, xylene, and the like can be used as diluent.

Impregnation in the present method can be carried out conveniently by a simple dip-and-squeeze procedure. Coating can be applied by means of air-knife, glass doctor, mayer's bar, or roll-coater. The amount of impregnation is controlled depending on the required degree of transparency. Transparency increases generally with the amount of impregnation.

Removal of the solvent can be carried out in a current of hot air up to 150° C. A higher temperature is not necessary.

After having been freed from the solvent, the treated web is wound up and allowed to harden by aging. This reaction requires no special equipment, but may be carried out by allowing the treated web to stand as wound up for 1 to 5 days. If necessary, the web roll can be rewound during the course of aging. Rewinding serves to accelerate hardening of the polyisocyanate compound by allowing the web to absorb atmospheric moisture.

After having been hardened on aging, the transparent paper of this invention acquires the aforesaid desirable characteristic properties.

The invention is illustrated below in detail with reference to Examples, but the invention is not limited to these Examples.

EXAMPLE 1

Coronate HL (produced by Nippon Polyurethane Co., an ethyl acetate solution containing 75% by weight of a reaction product of 1 mole of trimethylolpropane and 3 moles of hexamethylene diisocyanate, 12.5% (weight) NCO content, weight-average molecular weight about 750) was diluted with methyl isobutyl ketone to prepare an impregnating solution of a solids content of 50% by weight. A web of unsized paper, 50 g/m$^2$ basis weight, NBKP (bleached kraft pulp of needle leaved tree): LBKP (bleached kraft pulp of broad leaved tree) = 5 : 5, was impregnated with the above solution by the dip-and-squeeze method at an application rate of 20 g/m$^2$ in terms of solids. The impregnated web was dried in a current of hot air at 100° C. for 30 seconds to remove the solvents (ethyl acetate and methyl isobutyl ketone) and then wound up. The resulting paper roll was left standing at room temperature for 3 days to allow the hardening reaction to proceed during the aging.

The transparent paper thus obtained according to this invention had physical properties as shown in Table 1. As seen from Table 1, the transparency was good (low opacity), wet strength was excellent, and the difference between dry and wet dimensions was very small. By utilizing an electrophotography (e.g. "Xerox" reproduction process), there was obtained a satisfactory duplicating original for diazo copying without curling nor blistering. When a conventional tracing paper was used for comparison, blisters were occurred on exposure to heat during the fixing of toner and the paper was punctured and severely curled, rendering the duplicating original unfit for use.

EXAMPLE 2

Coronate 2040 (produced by Nippon Polyurethane Co.,; a 50% by weight solution in a mixture of xylene and "Cellosolve" acetate of a tolylene diisocyanate-based prepolymer, NCO content 4.5% by weight, viscosity 500 centistokes at 25° C., weight-average molecular weight about 1,400) was diluted with the same solvent mixture to a solids content of 20% by weight. The resulting solution was applied by means of an air-knife coater to the same unsized paper as used in Example 1 at a rate of 10 g/m$^2$ in terms of solids. The solution was found uniformly penetrated into the web. After removal of the solvent in a hot air at 100° C., the coated web was wound up and left standing at room temperature for 3 days to obtain a transparent paper of this invention, which had physical properties as shown in Table 1. Similarly to the transparent paper of Example 1, the above transparent paper was excellent, having uniform transparency, high wet strength, very small difference between the dry and wet dimensions, and low curling tendency. It was also excellent in suitability for use in electrophotography, writing quality, and erasability (india-rubber).

Table 1

| | | | Example 1 | Example 2 | Tracing paper for comparison |
|---|---|---|---|---|---|
| Basis weight, g/m$^2$ | | | 67.2 | 61.9 | 61.3 |
| Thickness, mm/100 | | | 6.1 | 6.5 | 5.0 |
| Density, g/cm$^3$ | | | 1.10 | 0.95 | 1.2 |
| Tensile strength, kg/15 mm width | Dry | M.D. (machine direction) | 8.4 | 6.6 | 10.5 |
| | | C.D. (cross direction | 5.2 | 4.9 | 4.7 |
| | Wet | M.D. | 4.0 | 3.5 | 1.0 |
| | | C.D. | 2.6 | 2.4 | 0.7 |
| Folding endurance, 1 kg load, number of times | Dry | M.D. | > 1,500 | > 1,500 | 250 |
| | | C.D. | > 1,500 | > 1,500 | > 1,500 |
| | Wet | M.D. | > 1,500 | > 1,500 | 0 |
| | | C.D. | > 1,500 | > 1,500 | 0 |
| Tearing strength, g, M.D. | | | 22 | 25 | 16 |
| Opacity, % | | | 25.9 | 39.9 | 23.5 |
| Cobb test (water, 20° C., 2 min.), g/m$^2$ | | | 4.2 | 6.0 | 32.9 |
| Change in length % | Expansion (immersion in water) | M.D. | + 0.11 | + 0.15 | + 0.34 |
| | | C.D. | + 0.45 | + 0.55 | + 5.7 |
| | Contraction (subsequent drying*) | M.D. | − 0.3 | − 0.4 | −1.8 |
| | | C.D. | − 0.3 | − 0.4 | − 0.9 |
| Suitability for use in xerography ("Xerox" type 2400) | | | good<br>no curling | good<br>no curling | bad (blister)<br>marked curing |

Table 1-continued

| | Example 1 | Example 2 | Tracing paper for comparison |
|---|---|---|---|
| Writing quality (pencil 2H) | good | good | good |
| Erasability (india-rubber eraser) | good | good | good |

Note:
*Linear expansion in % after immersion in water at 20° C. for 1 hour and linear contraction in % after subsequent air-drying at 20° C., 65% RH, both based on the original length at 20° C., 65% RH.

EXAMPLE 3

An organic solvent solution was prepared by weighing 5.13 kg of Coronate HL into a 20-liter stainless steel vessel, then diluting with 3.22 kg of methyl isobutyl ketone, and adding 1.65 kg of Fine-Oxocol (produced by Nissan Chemical Co.; an aliphatic monohydric alcohol having 18 carbon atoms, 100% by weight concentration) (OH/NCO $\approx$ 0.4 in said organic solvent solution).

A web of fine paper, 40 g/m$^2$ in basis weight, LBKP : NBKP = 8 : 2, was impregnated with the above solution by the dip-and-squeeze method at an application rate of 18 g/m$^2$. The impregnated web was dried in hot air at 80° C. for 30 seconds to remove the solvents (ethyl acetate and methyl isobutyl ketone), and then wound up. The roll web was left standing at room temperature for 3 days to allow the polyisocyanate to harden by aging and to obtain a transparent paper. The transparent paper thus obtained according to this invention had physical properties as shown in Table 2. As seen from Table 2, the transparency was good (low opacity) and uniform, dry and wet strengths were both excellent, and dimensional change (change in length on immersion in water and on subsequent drying) was very small. By utilizing an electrophotography (e.g. "Xerox" reproduction process), there was obtained a satisfactory duplicating original for diazo copying without curling nor blistering. It was also excellent in writing quality (pencil), erasability (india-rubber), and capability to accept photosensitive coating.

EXAMPLE 4

An organic solvent solution was prepared by weighing 6.8 kg of Coronate 2040 into a 20-liter stainless steel vessel, diluting with 2.6 kg of a xylene-"Cellosolve" acetate (1 : 1) mixture, and adding 0.6 kg of heptyl alcohol (produced by Nissan Petrochemical Co.; an aliphatic monohydric alcohol having 7 carbon atoms, 100% by weight concentration) (OH/NCO = 0.7 in said organic solvent solution).

A web of the same base paper as used in Example 3 was coated with the above solution by means of a air-knife coater at an application rate of 17.5 g/m$^2$. Because of its low viscosity, the solution penetrated uniformly into the web. The coated web was freed from the solvents (xylene and "Cellosolve" acetate) in hot air at 100° C., then wound up, and aged at room temperature for 3 days to obtain a transparent paper which had the physical properties as shown in Table 2.

Similarly to the transparent paper of Example 3, the above transparent paper was of excellent quality, having good and uniform transparency, excellent dry and wet strengths, very small dimensional change (change in length on immersion in water and on subsequent drying), and little curling. It was also good in solvent resistance and heat resistance. Further, it was suitable for use in electrophotography and excellent in writing quality (pencil), erasability (india-rubber), and capability to accept a photosensitive coating.

Table 2

| | | | Example 3 | Example 4 |
|---|---|---|---|---|
| Basis weight, g/m$^2$ | | | 51.2 | 46.5 |
| Thickness, mm/100 | | | 4.6 | 4.1 |
| Density, g/cm$^3$ | | | 1.11 | 1.13 |
| Hunter opacity, % | | | 24.1 | 30.9 |
| Clark stiffness, l$^3$/100 | | | 23.5 | 22.8 |
| Elmendorf tearing strength (C.D.), g | | | 22.0 | 21.0 |
| Cobb test (water, 20° C., 2 min.), g/m$^2$ | | | 7.3 | 8.5 |
| Change in length, % | Expansion (immersion in water) | M.D. | +0.11 | +0.12 |
| | | C.D. | +0.60 | +0.63 |
| | Contraction (subsequent drying) | M.D. | −0.31 | −0.33 |
| | | C.D. | −0.33 | −0.33 |
| Tensile strength, kg/15 mm | Dry (M.D.) | | 6.2 | 5.8 |
| | Wet (C.D.) | | 4.4 | 4.0 |
| IMT folding endurance, 1 kg load, number of times | Dry (M.D.) | | 1850 | 1700 |
| | Wet (C.D.) | | 1700 | 1550 |
| Toluene resistance | | | Good ($<$ − 1.0 g/cm$^2$) | Good ($<$ − 1.0 g/cm$^2$) |
| Methanol resistance | | | Good ($<$ − 1.0 g/cm$^2$) | Good ($<$ − 1.0 g/cm$^2$) |
| Suitability for use in electrophotography (heat resistance) | | | Good, no curling; flexible | Good, no curling; flexible |
| Writing quality (pencil 2H) | | | | |
| Erasability (india-rubber) | | | Good | Good |

Table 2-continued

| | Example 3 | Example 4 |
|---|---|---|
| Capability to accept photosensitive coating | Good | Good |

Note:

1. Toluene resistance and methanol resistance: Test specimens were immersed in toluene and methanol for 24 hours and the change in weight before and after immersion was measured to evaluate the leaching of the resin used as transparencizing agent.

2. Suitability for use in electrophotography (heat resistance): Tested by use of "Xerox type 2400" reproduction unit.

3. Capability to accept photosensitive coating: Test specimen was applied with a diazo-type photosensitive solution (water-base) and repellency to the solution, evenness of the coating, and curling of the test specimen were inspected.

EXAMPLE 5

An organic solvent solution was prepared by weighing 4.4 kg of Coronate HL into a 20-liter stainless steel vessel, diluting with 3.4 kg of methyl isobutyl ketone, and adding 2.2 kg of Nonipol 85 (produced by Sanyo Kasei Kogyo Co.; polyoxyethylene nonylphenol ether, about 8.8 moles of ethylene oxide units) (OH/NCO $\approx$ 0.3 in said organic solvent solution).

A web of fine paper, 40 g/m$^2$ in basis weight, LBKP : NBKP = 8 : 2, was impregnated with the above solution at an application rate of 18 g/m$^2$ by the dip-and-squeeze method. The impregnated web was dried in hot air at 80° C. for 30 seconds to remove the solvents and then wound up. The roll web was left standing at room temperature for 3 days to allow the polyisocyanate to harden by aging and to obtain a transparent paper. The transparent paper thus obtained according to this invention had physical properties as shown in Table 3. As seen from Table 3, the transparency was good (low opacity) and uniform, dry and wet strengths were both excellent, and dimensional change (change in length on immersion in water and on subsequent drying) was very small. It was also excellent in writing quality (water-base ink), capability to accept photosensitive coating and its adherence (for example, a silver halide emulsion for photocopying paper). When it was used in electrophotography (dry electrostatic reproduction, e.g. "Xerox" reproduction process), no staining of the reproduction equipment was detected and there was obtained a satisfactory duplicating original for diazo copying without curling, blistering, nor feathering of image, fixing of the toner having been very good.

EXAMPLE 6

An organic solvent solution was prepared by weighing 6.0 kg of Sanprene C-803 (produced by Sanyo Kasei Kogyo Co.; containing 50% by weight of a reaction product of tolylene diisocyanate and an alkyldiol, 2.06% by weight NCO content, weight-average molecular weight about 900) into a stainless steel vessel, diluting with 3.0 kg of toluene, and 1.0 kg of Emulgen 408 (produced by Kao Atlas Co.; polyoxyethylene oleyl ether, about 6.1 moles of ethylene oxide units) (OH/NCO = 0.6 in said organic solvent solution).

A web of the same fine paper as used in Example 5 was coated with the above solution by means of an air-knife coater at an application rate of 18 g/m$^2$. Because of its very low viscosity, the solution penetrated uniformly into the web. After removing the solvents in hot air at 100° C., the impregnated web was wound up, and aged at room temperature for 3 days. The thus obtained transparent paper had physical properties as shown in Table 3. Similarly to that obtained in Example 5, the above transparent paper showed a high and uniform transparency, excellent dry and wet strengths, very small dimensional change, and no tendency to curl. It was also excellent in writing quality (both pencil and water-base ink), capability to accept photosensitive coating and its adherence, erasability (india-rubber), and suitability for use in electrophotography.

EXAMPLE 7

An organic solvent solution was prepared by weighing out 4.67 kg of Sanprene C-810 (produced by Sanyo Kasei Kogyo Co.; containing 60% by weight of a reaction product of tolylene diisocyanate and an alkyldiol, 5.7% by weight NCO content, weight-average molecular weight about 1,000), diluting with 4.13 kg of toluene, and adding 1.2 kg of Nissan Nonion L-4 (produced by Nippon Oils and Fats Co.; polyoxyethylene laurate ester, about 8.6 moles of ethylene oxide units) (OH/NCO = 0.3 in said organic solvent solution).

A web of fine paper, 64 g/m$^2$ in basis weight, LBKP : NBKP = 9 : 1, was impregnated with the above solution at an application rate of 30 g/m$^2$ by the dip-and-squeeze method. After removal of the solvents in hot air at 120° C., the impregnated web was wound up, and aged at room temperature for 5 days. The resulting transparent paper had excellent physical properties as shown in Table 3.

EXAMPLE 8

1.6 Kilograms of Coronate L (produced by Nippon Polyurethane Co., a 75% by weight solution of a reaction product of 1 mole of trimethylolpropane and 3 moles of tolylene diisocyanate, 13.2% by weight NCO content, weight-average molecular weight about 720) and 2.4 kg of Sanprene C-803 (the same as mentioned above) were weighed out and mixed. The resulting mixture was diluted with 4.4 kg of xylene and admixed with 1.6 kg of Emulgen 920 (produced by Kao Atlas Co., polyoxyethylene nonylphenol ether containing about 17.3 moles of combined ethylene oxide units) to obtain an organic solvent solution (OH/NCO = 0.3).

A web of NCR base paper (produced by Mitsubishi Paper Mills Co., basis weight 56 g/m$^2$, LBKP : NBKP = 9 : 1) was impregnated with the above solution by the dip-and-squeeze method at an application rate of 22 g/m$^2$. After removal of the solvents in hot air at 120° C., the impregnated paper was wound up, left standing at room temperature for one day, then rewound, and left standing for another day to obtain a transparent paper.

Physical properties of this transparent paper obtained according to this invention were as shown in Table 3. Since this paper had been adjusted to 50% transparency, it was quite suitable for use in electrophotographic reproduction (dry electrostatic reproduction process), giving a desirable translucent duplicate original. Other properties were also excellent as shown in Table 3.

Table 3

| | | | Example 5 | Example 6 | Example 7 | Example 8 |
|---|---|---|---|---|---|---|
| Basis weight, g/m$^2$ | | | 50.6 | 47.1 | 75.8 | 62.4 |
| Thickness, mm/100 | | | 4.6 | 4.3 | 7.1 | 5.8 |
| Density, g/cm$^3$ | | | 1.10 | 1.10 | 1.07 | 1.08 |
| Hunter opacity, % | | | 25.5 | 33.1 | 47.3 | 50.1 |
| Clark stiffness, l$^3$/100 | | | 24.3 | 22.0 | 70.1 | 38.5 |
| Elmendorf tearing strength, g | | | 21.5 | 20.0 | 44.0 | 36.5 |
| Cobb test (water, 20° C., 2 min.), g/m$^2$ | | | 13.5 | 12.5 | 12.8 | 13.4 |
| Change in length, % | Expansion (immersion in water) | M.D. | +0.11 | +0.10 | +0.09 | +0.09 |
| | | C.D. | +0.59 | +0.59 | +0.57 | +0.58 |
| | Contraction (subsequent drying) | M.D. | −0.30 | −0.29 | −0.29 | −0.29 |
| | | C.D. | −0.34 | −0.34 | −0.34 | −0.34 |
| Tensile strength, kg/15 mm width | Dry (M.D.) | | 6.1 | 5.9 | 11.1 | 8.1 |
| | Wet (M.D.) | | 4.3 | 4.2 | 4.6 | 4.1 |
| MIT folding endurance, 1 kg load number of times | Dry (M.D.) | | 1850 | 1900 | 3400 | 2300 |
| | Wet (M.D.) | | 1750 | 1700 | 1800 | 1750 |
| Suitability for use in electrophotography (heat resistance, curling, etc.) | | | Good | Good | Good | Good |
| Writing quality (pencil 2H) | | | Good | Good | Good | Good |
| Erasability (india-rubber) | | | Good | Good | Good | Good |
| Writing quality (water-base ink) | | | Good | Good | Good | Good |
| Capability to accept photosensitive coating | | | Good | Good | Good | Good |
| Adherence of photosensitive coating | | | Good | Good | Good | Good |

Note:
1. Suitability for use in electrophotography: tested by use of "Xerox type 2400B" reproduction unit.
2. Capability to accept photosensitive coating and its adherence: tested by using a silver halide emulsion for photocopying paper.

The amount of material impregnated into the paper can be calculated by the following equation:

$$\frac{\text{Basis weight of the product } (g/m^2) - \text{Basis weight of the raw paper } (g/m^2)}{\text{Basis weight of the raw paper}} \times 100 = \text{solid impregnated \%}$$

From calculation of each Example by this equation, the impregnation percent (%) of each Example is:

Example 1 : 34.4%
Example 2 : 23.8%
Example 3 : 28.0%
Example 4 : 16.3%
Example 5 : 26.5%
Example 6 : 17.8%
Example 7 : 18.4%
Example 8 : 11.4%

In the above equation the term "Basis weight of the raw paper" signifies "The weight of paper before treatment per area." "Basis weight of the product" signifies "The weight of the treated paper per area."

The impregnation percentages were calculated from the data in Examples 1–8 as follows, using Example 1 as the illustration:

Basis weight of the raw paper: 50 g/m$^2$ (see page 11 line 19)

Basis weight of the product: 67.2 g/m$^2$ (see Table 1)

Thus, the impregnation percent (%) is:

$$\frac{67.2 - 50}{50} \times 100 = 34.4 \text{ (\%)}$$

In Example 2 Basis weight of the raw paper is 50 g/m$^2$ as in Example 1 and Basis weight of the product is 61.9 g/m$^2$ (from Table 1). In Examples 3 and 4, the Basis weight of the raw paper is 40 g/m$^2$ and from Table 2 the Basis weight of the product is 51.2 g/m$^2$ in Example 3 and 46.5 g/m$^2$ in Example 4. In Examples 5 and 6 the Basis weight of the raw paper is 40 g/m$^2$ and from Table 3 the Basis weight of the product is 50.6 g/m$^2$ in Example 5 and 47.1 g/m$^2$ in Example 6. In Example 7 the Basis weight of the raw paper is 54 g/m$^2$ and from Table 3 the Basis weight of the product is 75.8 g/m$^2$. In Example 8 the Basis weight of the raw paper is 56 g/m$^2$ and from Table 3 the Basis weight of the product is 62.4 g/m$^2$.

We claim:

1. A method for producing a transparent cellulosic paper which consists essentially of coating or impregnating a cellulosic paper with an organic solvent solution consisting essentially of the organic solvent and a compound having a weight-average molecular weight of 200 to 2,000 and having at least two isocyanate groups in the molecule; removing said organic solvent; and allowing the resulting coated or impregnated cellulosic paper to harden by aging, the amount of said compound being sufficient to make the cellulosic paper transparent by filling the pores of the cellulosic paper.

2. A method according to claim 1 wherein the cellulosic paper is impregnated with 23.8% of said compound.

3. A method for producing a transparent cellulosic paper which consists essentially of coating or impregnating a cellulosic paper with an organic solvent solution consisting essentially of the organic solvent and (a) a compound having a weight-average molecular weight of 200 to 2,000 and having at least two isocyanate groups in the molecule and (b) at least one compound selected from the group consisting of an aliphatic monohydric alcohol having 6 to 18 carbon atoms and a nonionic surface active agent of the polyethylene glycol type having one hydroxyl group in the molecule, said compounds (a) and (b) being contained in a ratio of OH/NCO < 1; removing said organic solvent; and allowing the resulting coated or impregnated cellulosic paper to harden by aging, the amount of said compounds (a) and (b) being sufficient to make the cellulosic paper transparent by filling the pores of the cellulosic paper.

4. A method for producing a transparent cellulosic paper according to claim 3, wherein the ratio OH/NCO is OH/NCO < 0.7.

5. A method according to claim 3 wherein the cellulosic paper is impregnated with 11.4% to 28.0% of said compounds.

6. A transparent cellulosic paper obtained by the method according to claim 1.

7. A transparent cellulosic paper obtained by the method according to claim 3.

* * * * *